United States Patent [19]

Hisanaga et al.

[11] Patent Number: 5,872,962
[45] Date of Patent: Feb. 16, 1999

[54] PROGRAM CONTROL SYSTEM

[75] Inventors: Takanori Hisanaga; Fumiyoshi Kawase; Koh Kamizawa, all of Nakai-machi, Japan

[73] Assignee: Fuji Xerox Co., Ltd., Tokyo, Japan

[21] Appl. No.: 634,731

[22] Filed: Apr. 18, 1996

[30] Foreign Application Priority Data

May 24, 1995 [JP] Japan .................................... 7-125356

[51] Int. Cl.⁶ .................................................. G06F 9/32
[52] U.S. Cl. .................... 395/571; 395/567; 395/580; 395/595
[58] Field of Search ................... 395/571, 567, 395/580, 591, 595

[56] References Cited

U.S. PATENT DOCUMENTS

| | | | |
|---|---|---|---|
| 4,124,893 | 11/1978 | Joyce et al. | 364/200 |
| 4,407,015 | 9/1983 | Ziobro | 364/200 |
| 4,562,538 | 12/1985 | Berenbaum et al. | 364/200 |
| 4,766,531 | 8/1988 | Hunesman et al. | 364/200 |
| 5,371,862 | 12/1994 | Suzuki et al. | 395/375 |

OTHER PUBLICATIONS

"Transistor Technology," CQ Publishing Company, vol. 6, 1991, pp.456–458.
"M6800 Microprocessor USer's Manual," Motorola Inc., CQ Publishing Company, Appendix D, p. 189.
"Transistor Technology," CQ Publishing Company, vol. 6, 1991, pp. 448–449.

Primary Examiner—Lucien U. Toplu
Attorney, Agent, or Firm—Oliff & Berridge, PLC

[57] ABSTRACT

The present invention provides a program control system comprises plural programs each of which includes an instruction to execute a process corresponding to each of plural statuses of the system, a program memory for storing the plural programs, a program counter for outputting an address of the memory at which a part of the plural programs to be executed is stored, the address including a flag which indicates one of the plural statuses, and execution means for reading one of the programs from the program memory in accordance with the address output by the program counter and executing the read program.

7 Claims, 6 Drawing Sheets

Fig. 3

| ADDRESS | DATA | |
|---|---|---|
| | INSTRUCTION TO BE EXECUTED NEXT | INSTRUCTION FOR PROCESSING |
| 00 ••• ••• ••• 00 | 000 | 000 |
| | | |
| 11 ••• ••• •••11 | 000 | 111 |

Fig. 6     PROCESS T REQUEST & NO PROCESS S REQUEST

Carry: Set to 1 when carry is generated in operation.
Set to 0 when carry is not generated.

oVerflow: Set to 1 when operation causes overflow.
Set to 0 when operation causes no overflow.

Zero: Set to 1 when result of operation is 0.
Set to 0 when result of operation is other than 0.

Negative: Set to 1 when result of operation is negative.
Set to 0 when result of operation is not negative.

PROGRAM CONTROL SYSTEM

BACKGROUND OF THE INVENTION

1. Field of the Invention

The present invention relates to a program control system which executes plural processes by switching according to the status.

2. Discussion of the Related Art

Figure 7:
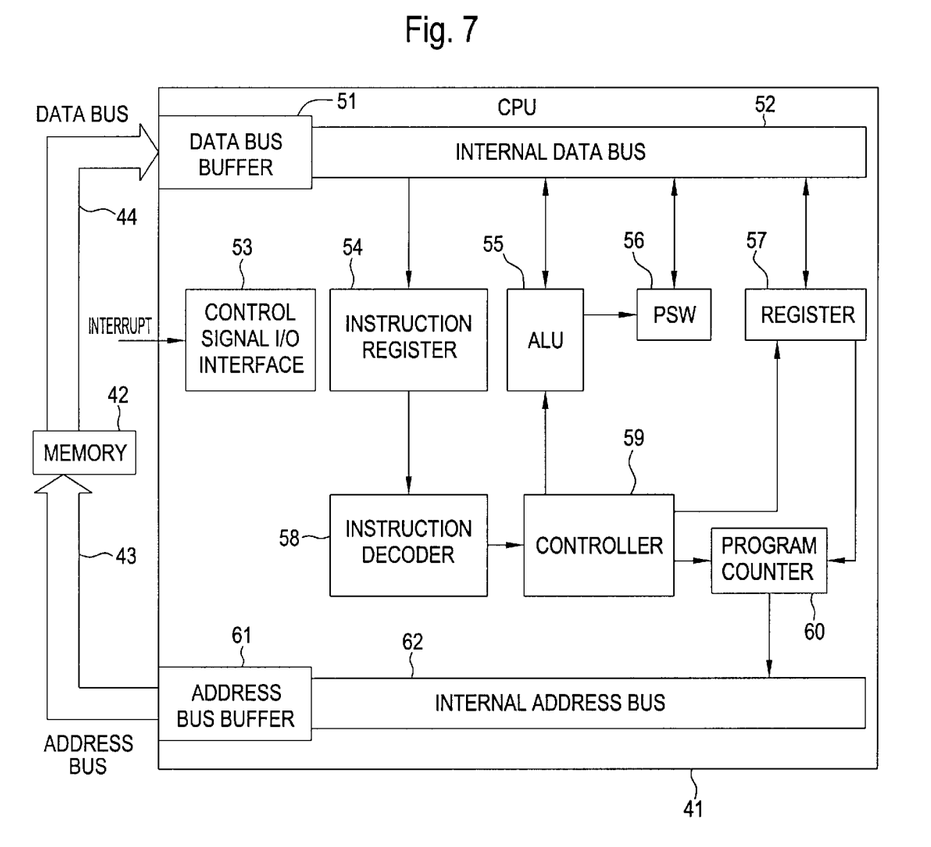
FIG. 7 is a schematic view showing an ordinary CPU system.

Conventionally, a CPU has executed process switching according to the status (or, referred to as Context Switch) by interrupt or branch instruction. FIG. 7 is a schematic view showing an ordinary CPU system. In the figure, a CPU is indicated by 41, a memory is indicated by 42, an address bus is indicated by 43, a data bus is indicated by 44, a data bus buffer is indicated by 51, an internal data bus is indicated by 52, a control signal I/O interface is indicated by 53, an instruction register is indicated by 54, an operation part (or arithmetic and logic unit, hereinafter referred to as ALU) is indicated by 55, a program status word (hereinafter, referred to as PSW) is indicated by 56, a register is indicated by 57, an instruction decoder is indicated by 58, a controller is indicated by 59, a program counter (PC) is indicated by 60, an address bus buffer is indicated by 61 and an internal address bus is indicated by 62.

The CPU 41 reads one of programs stored in the memory 42 and operates in accordance with the read content. The counter 60 specifies a position of storing the program, namely, an address. The CPU 41 outputs a value of the program counter 60 to the address bus 43 through the internal address bus 62 and the address buffer 61, for reading the contents of the memory 42. The contents, namely, the instructions are provided to the instruction register 54 through the data bus 44, the data bus buffer 51 and the internal data bus 52. A cycle of reading an instruction to be executed, as described above, is called a fetch cycle.

Figure 8:
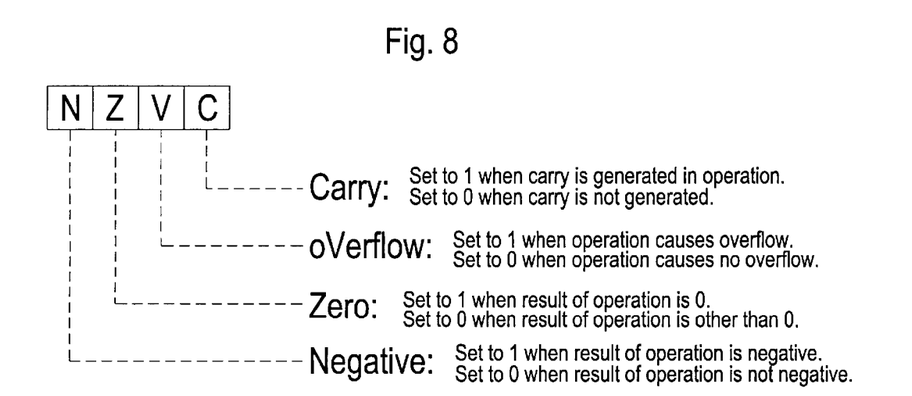
FIG. 8 illustrates an example of a PSW.

The instruction provided to the instruction register 54 by the fetch cycle is interpreted by the instruction decoder 58 to execute operation in accordance with the instruction, reading or writing the data from/to the memory, transfer to the I/O interface 53 or the like through the controller 59. At this time, carrying out of the operation is executed by the ALU 55, and operand or the result of operation is stacked in the register 57. Moreover, a flag indicating the status of the result of operation is stacked in the PSW 56. FIG. 8 illustrates an example of the PSW, which shows four flags. The flag N is set to 1 when the result of the operation is negative, otherwise it is set to 0. The flag Z is set to 1 when the result of operation is 0, and when the result of operation is other than 0, it is set to 0. The flag V is set to 1 when the operation causes overflow, and set to 0 when the operation causes no overflow. The flag C is set to 1 when the carry is generated in the operation, otherwise set to 0. There is, of course, a case where other flags are set in the PSW 56. A cycle executing various processes in accordance with the instruction read by the fetch cycle, as described above, is called an execution cycle. A register held inside of the CPU 41 frequently used for stacking data, such as the register 57 or the PSW 56, is called a system register. The CPU 41 basically repeats the fetch cycle and the execution cycle alternately.

Figure 9:
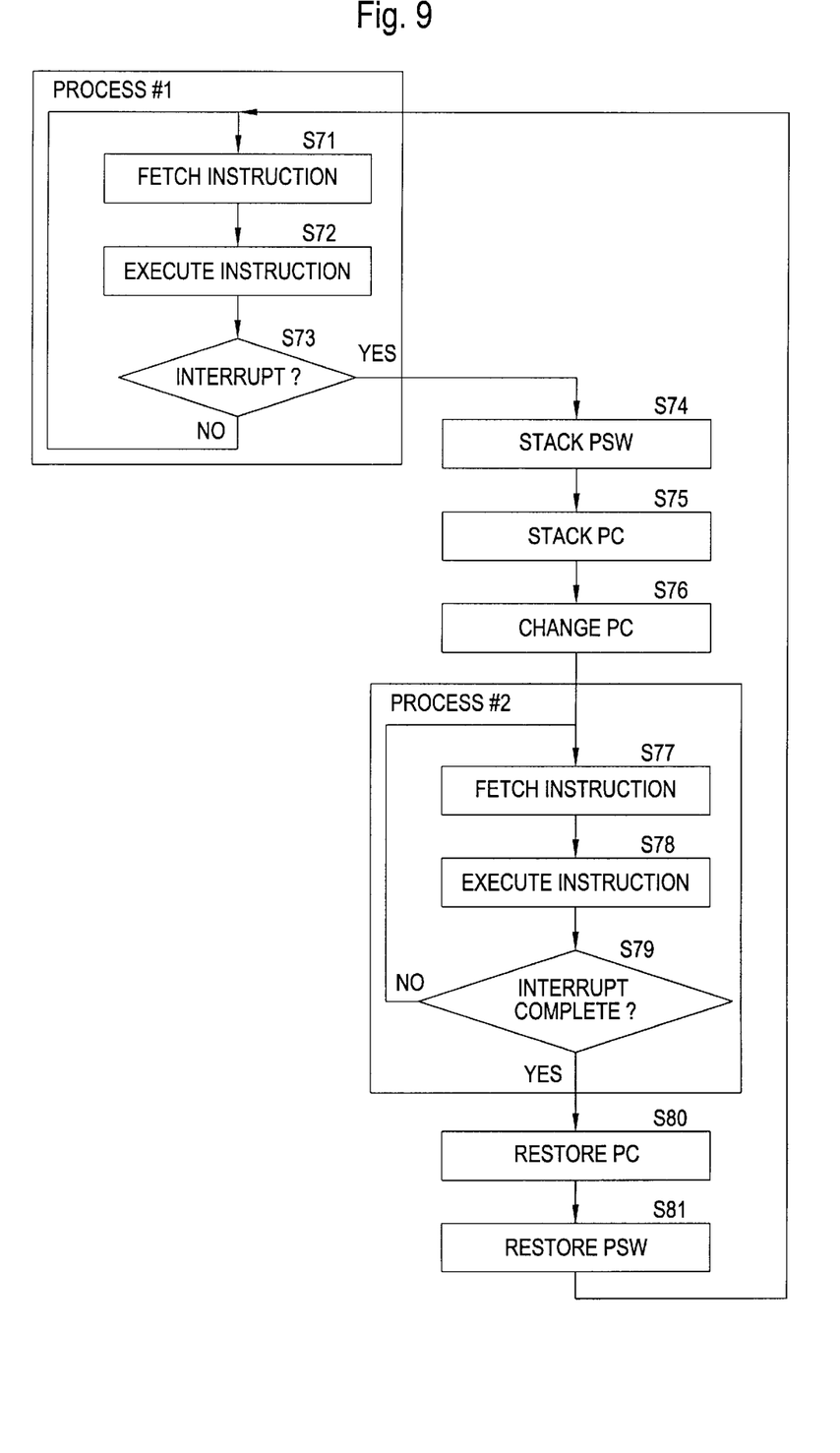
FIG. 9 is a flow chart showing the procedure of an ordinary interrupt process.

Only if an external request of execution of other process is made, that is, an interrupt is made, the system proceeds to an interrupt processing cycle after the execution cycle. In FIG. 7, the interrupt is input through the control signal I/O interface 53. FIG. 9 is a flow chart showing a procedure of an ordinary interrupt process. In the figure, it is assumed that a process prior to the interrupt is process #1 and a process executed by the interrupt is process #2. In process #1, which is prior to the interrupt, the instruction fetch cycle in step 71 and the instruction execution cycle in step 72 are alternately repeated as described above. When the interrupt occurs, it is detected in step 73 and the system moves to the interrupt processing cycle.

In the interrupt processing cycle, values of the PSW 56 and the program counter 60 are first stacked in steps 74 and 75, and then the contents of the program counter 60 is changed in step 76. The address to be changed is determined in accordance with the type of the interrupt signal. At the branching destination address of the interrupt process, an interrupt processing program is located. In process #2, which is the interrupt processing program, the instruction fetch cycle in step 77 and the instruction execution cycle in step 78 are alternately repeated as same as process #1. At the end of the interrupt processing program, the system proceeds to steps 79 and 80, and further in steps 80 and 81, the values of the PSW 56 and the program counter 60 are restored to the former values, whereby the process returns to process #1 at the time when the interrupt occurs. This kind of ordinary interrupt operation is described in various references, such as "Transistor Technology", CQ publishing company, Vol. 6, 1991, pp. 456–458.

Figure 10:
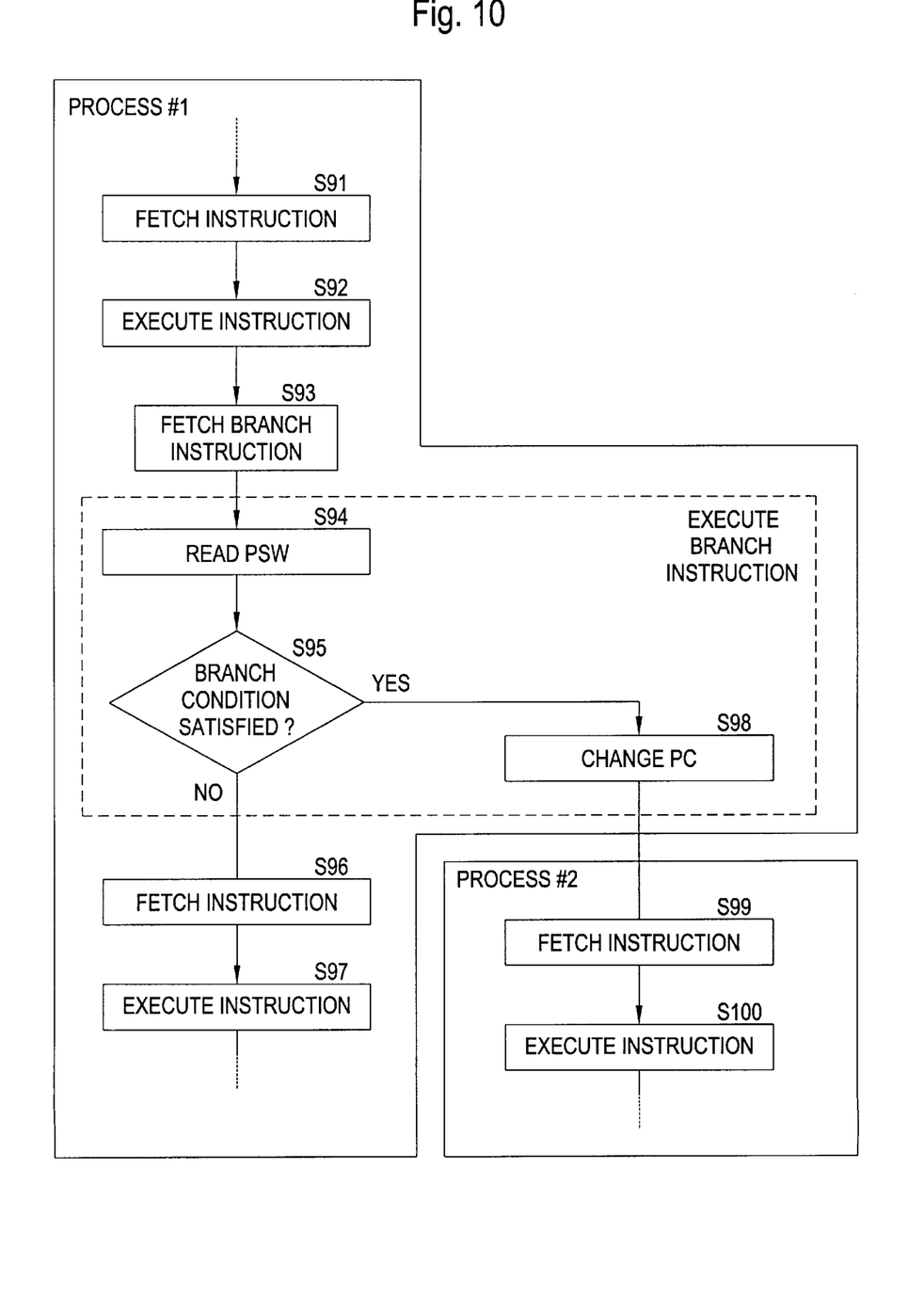
FIG. 10 is a flow chart showing the procedure of processing of an ordinary branch instruction.

Other than the interrupt process, it is also possible to switch to the other process which is under execution. In this case, a branch instruction is used. FIG. 10 is a flow chart showing a procedure of processing an ordinary branch instruction and is indicating a case where process #1 branches into process #2. As described above, the instruction fetch cycle and the instruction execution cycle are alternately repeated in process #1. Steps 91 and 92 indicate fetch and execution, respectively, on the instruction prior to the branch instruction. If the process is changed by the branch instruction, a processing result or change of the external status, which is the condition of changing, is reflected in the PSW 56. The CPU 41 fetches the branch instruction in step 93, reads the status stored in the PSW 56 in step 94, and determines whether the status satisfies the branch condition in step 95. If the status does not satisfy the branch condition, fetch and execution of next instruction in process #1 are continued without branching as shown in steps 96 and 97. If the read status satisfies the branch condition, the value of the program counter 60 is changed to the specified address in step 98 to switch the process. Then, as shown in steps 99 and 100, fetch and execution of the instruction in process #2 are alternately repeated. The procedure of processing of such branch instruction is also described in various references, such as, the above-described "Transistor Technology"CQ publishing company, Vol. 6, 1991, pp. 448–449.

If it is required that the plural processes are executed by switching appropriately in accordance with the process result, change of the external status or external request with high-speed or in real time, there occur the following problems in process switching by interrupt or branch instruction in the CPU.

In the case of interrupt, processes of stacking in the PSW and the program counter, and changing of the program counter are carried out within the period of switching from one process to another (long interrupt). These processes cause overhead which cannot be ignored if quick operation for process switching is required. For example, as noted in "M68000 Microprocessor User's Manual", Motorola Inc., CQ Publishing Company, Appendix D, page 189, MC68000 requires 44 clocks during the period from accepting the interrupt to fetching the first instruction of the interrupt processing routine. In the case of the process which does not require stacking in the register such as the PSW (short interrupt), it is possible to reduce or delete the stacking operation, but the process of changing the program counter is still necessary, and is left as the overhead in process switching.

In the case of process switching according to the branch instruction, execution of the branch instruction itself, that is, reading the PSW, condition determination and changing the program counter, is necessary, and results in the overhead which cannot be ignored as same as the case of the interrupt process. In the case of MC68000 described above, 8 clocks or more are required even in the case of jump instruction without condition determination. The branch instructions must be located on the points having potentiality of occurrence of process changing in the program.

As described above, if the process switching is carried out by interrupt or branch instruction in the CPU, the overhead necessarily occurs in switching. The delay in processing caused by the overhead comes into problem if the process is desired to be executed at high-speed or in real time.

Figure 6:
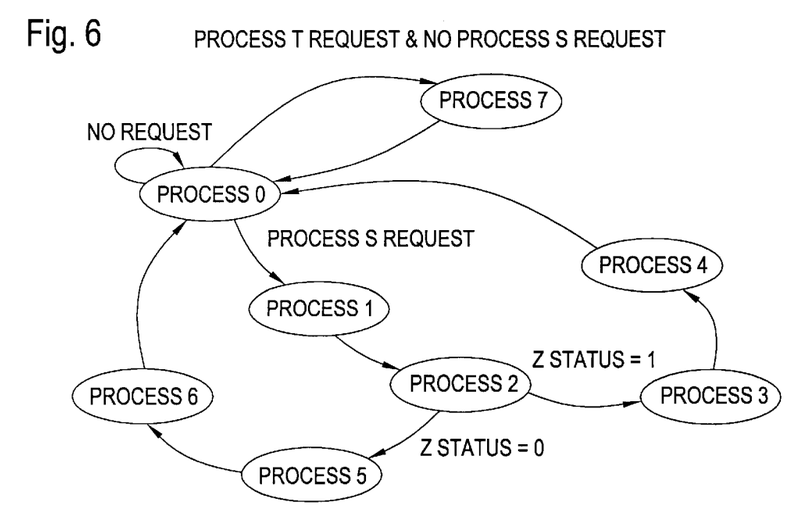
FIG. 6 illustrates an example of a process flow.

FIG. 6 illustrates an example of a process flow. The problem described above is now illustrated by taking the process flow shown in FIG. 6 as an example. In the process flow, the system repeats process 0 as a normal procedure. If request S is made, the system moves to process 1. If request T is made and request S is not made, the system moves to process 7. After execution of process 2, if zero (Z) status is 1, the system moves to process 3, and if it is 0, the system moves to process 5. Other movements are made unconditionally after execution of each process.

If the process flow is carried out by the conventional CPU, the interrupt process is needed to move from process 0 to process 1 or 7, and the branch instruction is needed to move from process 2 to process 3 or 5. Consequently, the overhead occurs on the point of interrupt or branch instruction for process switching, which may hinder the switching in real time, for example.

SUMMARY OF THE INVENTION

The present invention has been made in view of the above circumstances and has as an object of provision of a program control system capable of dealing with high-speed or real time process, and executing plural processes by switching according to change of the status without causing overhead.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, a program control system of the present invention comprises plural programs each of which includes an instruction to execute a process corresponding to each of plural statuses of the system, a program memory for storing the plural programs, a program counter for outputting an address of the memory at which a part of the plural programs to be executed is stored, the address including a flag which indicates one of the plural statuses, and execution means for reading one of the programs from the program memory in accordance with the address output by the program counter and executing the read program.

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings.

DETAILED DESCRIPTION OF THE PREFERRED EMBODIMENT

Preferred embodiment of a program control system according to the present invention is now described in detail based on the drawings.

First Embodiment

Figure 1:
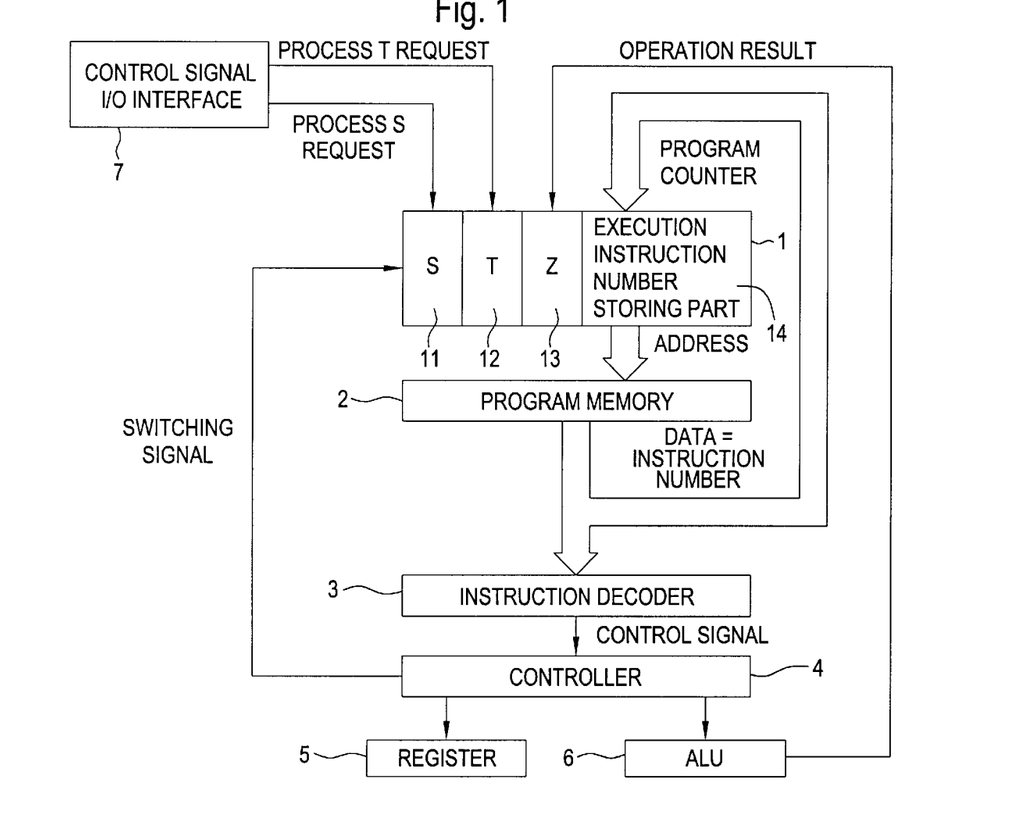
FIG. 1 is a schematic construction view showing an embodiment of a program control system according to the present invention.

FIG. 1 is a schematic construction view showing an embodiment of the program control system according to the present invention. In the figure, a program counter is indicated by 1, a program memory is indicated by 2, an instruction decoder is indicated by 3, a controller is indicated by 4, a register is indicated by 5, an ALU is indicated by 6, a control signal I/O interface is indicated by 7, a process S request flag is indicated by 11, a process T request flag is indicated by 12, a zero (Z) status flag is indicated by 13 and an execution instruction number storing part is indicated by 14.

The program counter 1 consists of the process S request flag 11, the process T request flag 12, the zero status flag 13 and the execution instruction number storing part 14. The process S request flag 11 and the process T request flag 12 are set respectively in accordance with a process S request and a process T request which have been input through the control signal I/O interface 7. The zero status flag 13 is set in the case where the result of operation carried out in the ALU 6 is 0. To the execution instruction number storing part 14, a part of data or a whole data read from the program memory 2 is input.

The information related to the instruction to be executed next is stored in the whole program memory 2 or in a part of it. The program memory 2 receives the content of the program counter 1 as an address for outputting data corresponding to the address. The instruction decoder 3 receives and decodes the data read from the program memory 2, and outputs a corresponding control signal to the controller 4. The controller 4 receives the control signal from the instruction decoder 3 and executes a process in accordance with the control signal using the register 5, the ALU 6 or the like. The register 5 is used for temporarily stacking the data. The ALU 6 carries out various operations. If the operation result is 0, the zero status flag 13 in the program counter 1 is set. If the operation result is other than 0, the zero status flag 13 is reset. The control signal I/O interface 7 accepts the external process request or detects the change of the external status, and inputs the accepted external process request or the detected change of the external status as the process S request or the process T request to the program counter 1, whereby the process S request flag 11 and the process T request flag 12 are set or reset.

Figure 2:
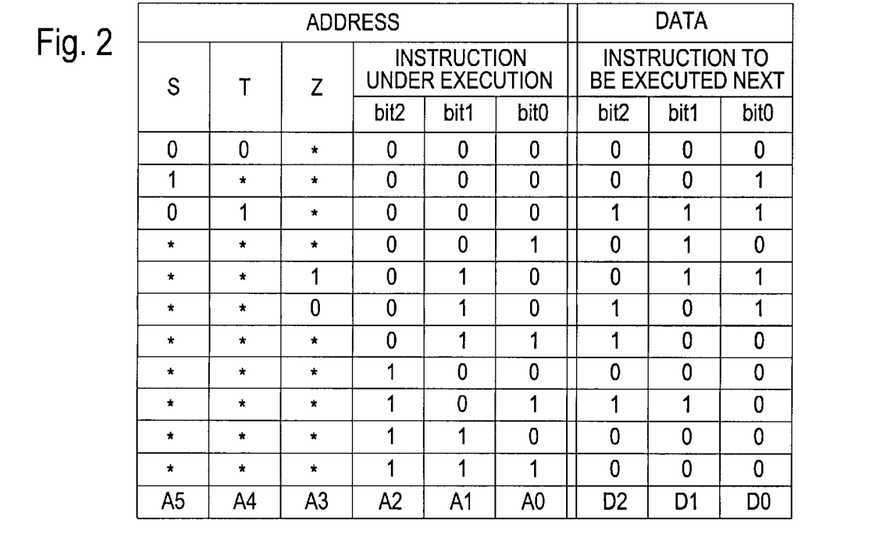
FIG. 2 illustrates an example of content of a program memory.

FIG. 2 illustrates an example of the content of the program memory 2. In the figure, program addresses are indicated by A5 to A0, and data are indicated by D2 to D0. Among from the memory addresses A5 to A0, the bit marked with * may be either 1 or 0. That is, the addresses indicated by both of bit 1 and bit 0 have the same data. For example, the first row of the table in FIG. 2 indicates that the same data 000 is stored in addresses 000000 and 001000.

In the program memory 2, data of D2 to D0 is stored. In this example, the data indicates the execution instruction number to be decoded by the instruction decoder 3 for executing the process in accordance with the instruction, such as an operation, through the controller 4. The execution instruction number is input to the execution instruction number storing part 14 in the program counter 1 for determining the next execution instruction number to be carried out. In FIG. 2, the data indicate the process numbers of the process flow shown in FIG. 6.

Next, the operation in the embodiment of the program control system according to the present invention is described using the program memory whose content is shown in FIG. 2 and taking the case of realizing the process flow shown in FIG. 6 as an example. As an initial status, it is assumed that the process S request flag 11, the process T request flag 12 and the zero status flag 13 are all 0, and the execution instruction number is 000. At this time, the address 000000 in the program memory 2 is accessed and the data 000 is output from the program memory 2 according to the table in FIG. 2. The output is transferred to the instruction decoder 3 to be decoded, and the control signal for executing process 0 is output to the controller 4. The controller 4 executes process 0 in accordance with the control signal from the instruction decoder 3 using the register 5 and the ALU 6.

The data 000 output from the program memory 2 is input to the execution instruction number storing part 14 in the program counter 1. When execution of process 0 in the controller 4 is completed, a switching signal is input to the program counter 1, whereby each value of the program counter 1 is updated. In this case, the data 000 output from the program memory 2 is set as the execution instruction number again, but the value of the program counter 1 does not change. Therefore, the same process 0 is executed again as the next process.

During execution of process 0 in the controller 4, if the result of the operation using the ALU 6 is 0, the ALU 6 sets the zero status flag 13 in the program counter 1 to 1. In this case, the content of the program counter 1 is 001000. Because the data 000 is output from the program memory 2 shown in FIG. 2, process 0 is still executed.

When the process S request is made from the external, the process S request flag 11 is set to 1 through the control signal I/O interface 7. In this case, the program counter 1 comes under the value of the second row of the table in FIG. 2, and the data 001 is read regardless of values of the process T request flag 12 and the zero status flag 13. That is, program counter 1 is any of the values 100000 101000, 110000 and 111000 having the data 001, and accordingly, the data 001 is read. The instruction decoder 3 decodes the data and identifies it with process 1, then outputs the control signal to the controller 4 so as to execute process 1. The controller 4 executes process 1 according thereto.

The read data 001 is input to the execution instruction number storing part 14 in the program counter 1. In accordance with the switching signal output with the completion of execution of process 1 in the controller 4, the data 001 is set to the program counter 1. Then the value of the program counter 1 comes under the fourth row of the table in FIG. 2; therefore the data of the fourth row 010 is read and process 2 is executed. During execution of process 2, if the result of operation in the ALU 6 is 0, the zero status flag is set to 1 and the value of the program counter 1 becomes **1010. Thus a process 3 is executed next. Process 4 is executed subsequently, and then process 0 is executed.

In process 2, if the operation result is other than 0, the zero status flag is reset to 0; accordingly, the value of the program counter 1 is **0010, and process 5 is executed next. Subsequently, process 6 is executed and further process 0 is executed.

During execution of process 0, if the process T request is input from external, the process T request flag 12 in the program counter 1 is set. At that time, if the process S request flag is not set, the program counter 1 becomes 01*000, and therefore, the data 111 is read and process 7 is executed. After execution of process 7, process 0 is executed.

In this way, the process flow shown in FIG. 6 is executed in accordance with the content of the program memory as shown in FIG. 2. In execution, because the external process S request or process T request is directly reflected in the program counter 1, the system can proceeds to process requested after execution of instruction without requiring operation for process switching. Similarly, determination of the zero status value is also reflected directly in the program counter; consequently, operation for determination is unnecessary. Moreover, unconditional process switching can be carried out without operation for switching. That is, within the repeated fetch cycle and execution cycle of the process to be primarily executed, switching of process can be carried out.

The content of the program memory 2 shown in FIG. 2 is merely an example of execution of the process flow shown in FIG. 6, and does not set limits thereto. Actually, the process flow to be executed is determined in the apparatus to which the program control system of the present invention is applied, and the content of the program memory can be set in accordance with the determined process flow.

This embodiment fetches flags necessary to implement the process flow shown in FIG. 6 in the program counter 1, for special purpose. However, the present invention is not limited thereto and is able to increase the number of bits of the external request flag, that is, able to provide a PSW of high frequency in use as shown in FIG. 8 or a data register capable of stacking the operation result or the like in the program counter 1 to serve the general purpose.

Figure 3:
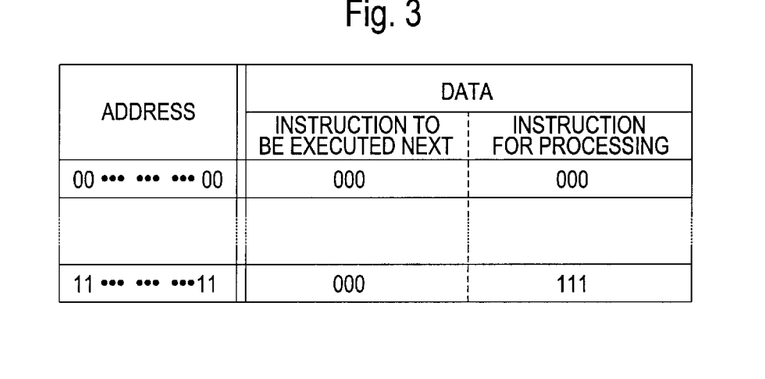
FIG. 3 illustrates another example of content of the program memory.

The above-described example shown in FIG. 2 indicates the case where the execution instruction number to be executed next is stored in the program memory 2 and used for both of execution of process and update of the program counter 1, but this is not a limitation. FIG. 3 illustrates another example of the content of the program memory 2. In the figure, the process instruction to be executed is stored in the program memory 2 accompanied with the execution instruction number to be executed next which is set in the program counter 1. The execution instruction number and the process instruction are read from the program memory 2 according to the address from the program counter 1. The read execution instruction number is input to the execution instruction number storing part 14 in the program counter 1 and the process instruction is input to the instruction decoder 3. In this way, the execution instruction number and the process instruction to be executed next are connected with each other and stored in the program memory 2.

Figure 4:
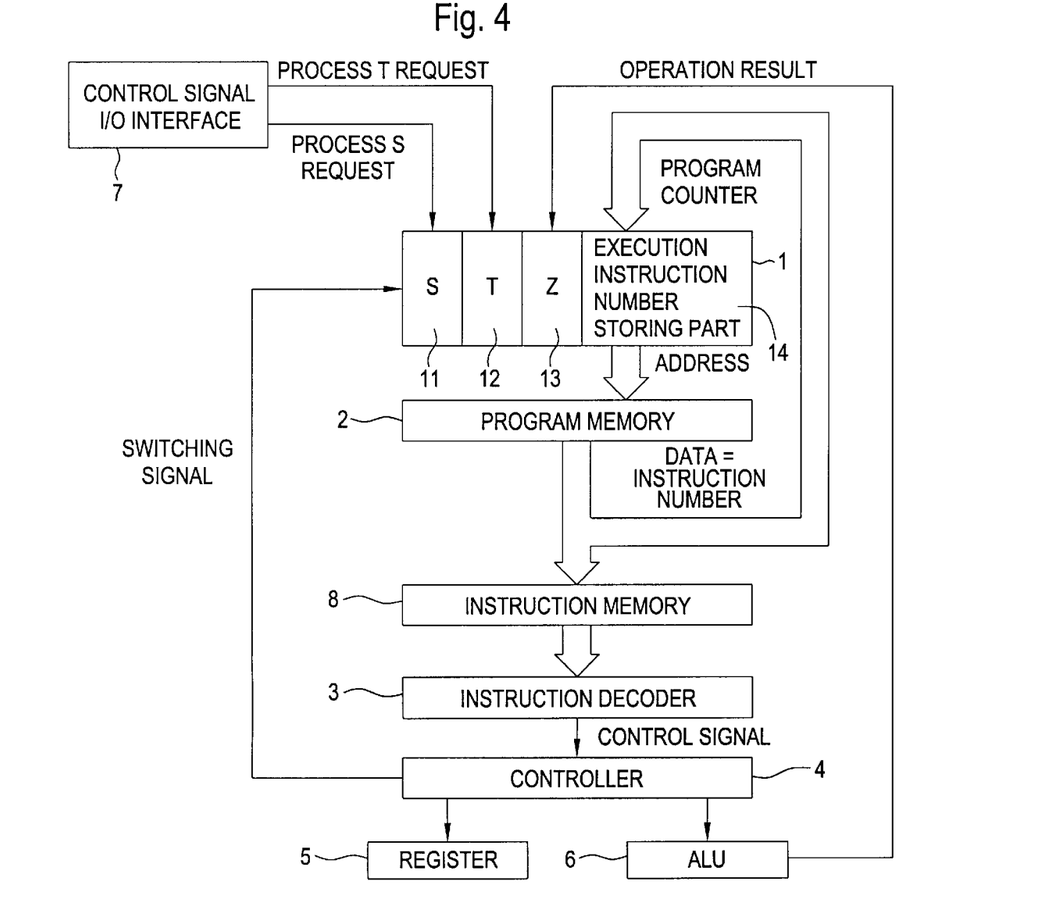
FIG. 4 is a construction view showing a modification of the embodiment of the program control system according to the present invention.

FIG. 4 is a construction view showing the modification example of the embodiment of the program control system according to the present invention. In the figure, portions corresponding to portions in FIG. 1 have the same reference numbers as those of FIG. 1 and the explanation is omitted. An instruction memory is indicated by 8. In this example, the execution instruction number read from the program memory 2 is not regarded as the instruction, but the instruction memory 8 is accessed in accordance with the read execution instruction number, and the instruction read from the instruction memory 8 is decoded by the instruction decoder 3 for executing the process corresponding thereto by the controller 4. In this case, the instruction corresponding to the execution instruction number is stored in the instruction memory 8. By the instruction memory 8, it is explicitly indicated that the same process is executed in accordance with another execution instruction number. Mere rewriting of the content of the instruction memory 8 enables changing of the process such as execution of a different process only in the case of debugging with ease. Furthermore, by providing an address decoder assigning an address to the instruction memory 8 on accepting the execution instruction number, it becomes possible to execute many processes in accordance with a single execution instruction number.

Figure 5:
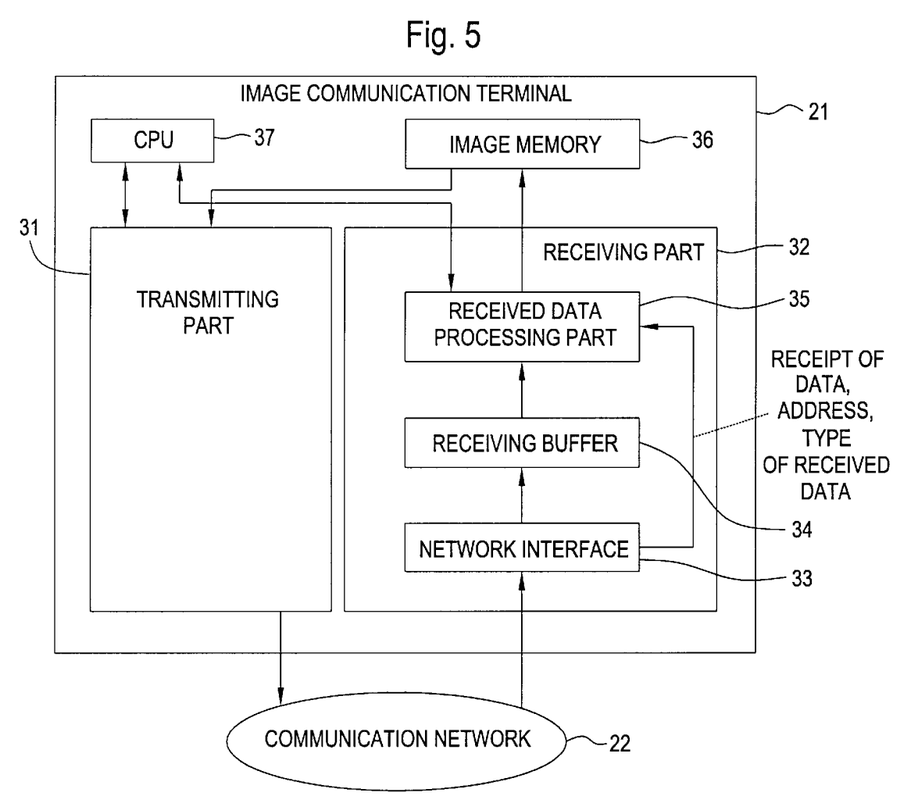
FIG. 5 is a construction view showing an application example of the program control system according to the present invention.

FIG. 5 is a construction view of an application example of the program control system according to the present invention. In the figure, an image communication terminal is indicated by 21, a communication network is indicated by 22, a transmitting part is indicated by 31, a receiving part is indicated by 32, a network interface is indicated by 33, a receiving buffer is indicated by 34, a received data processing part is indicated by 35, an image memory is indicated by 36, and a CPU is indicated by 37. Here, an example of application of the program control system to the image communication device is described. The image communication terminal 21 is connected to the communication network 22 and carries out raster static image communication between another terminal. The image communication terminal 21 has the transmitting part 31, the receiving part 32, the image memory 36 and the CPU 37.

Here, to be more concrete, communication is implemented using the Asynchronous Transfer Mode (ATM) communication network.

The image memory 36 permanently stores the image data and has a sufficient capacity. The image memory 36 receives the image data from the receiving part 32, and outputs the data to the transmitting part 31 in transmitting process. The CPU 37 executes a synchronizing control of communication with the opponent terminal, thus managing the whole terminal.

The receiving part 32 comprises the network interface 33, the receiving buffer 34 and the received data processing part 35. The network interface 33 executes protocol processing on the data received from the communication network 22 and transfers it to the receiving buffer 34. At the same time, receipt of the data, an address of the data on the receiving buffer 34 and type of the received data are input to the received data processing part 35. The receiving buffer 34 temporarily stores the received data, which has a capacity less than a total amount of a piece of image data. On receiving the above information from the network interface 33, the received data processing part 35 fetches the data from the receiving buffer 34 and executes the prescribed process. It is possible to implement the received data processing part 35 by the program control system of the present invention and execute the prescribed process.

Here, blocks located inside of the receiving part 32 are shown in the FIG. 5 and the following description takes the receiving part 32 as an example. The transmitting part 31 can be constructed in the same way.

An example of receiving operation of the image communication terminal 21 is now explained. The image communication terminal 21 receives two types of data: one of which is an image data, and the other is the control data for synchronizing the communication, such as transmission request, receiving request, transmission acceptance, and receiving acceptance. A sequence number indicating the location in the image is added to each image data. The two types of data are distinguished from each other by an identifier in the data. Here the network interface 33 executes the identification and inputs the result to the received data processing part 35. In the case of the image data, the sequence number is checked and if it is proved to be the data corresponding to the top of the line in the image, a destination address in the image memory 36 is jumped by a prescribed amount for line synchronization. If it is proved to be otherwise, the image data is sequentially transferred.

Here, top of the line means the top of the scanning line in the image.

This process can be described with reference to the process flow shown in FIG. 6, for example. The concrete processing contents of the process flow in FIG. 6 are as follows.

Process S request: inputting image data receipt

Process T request: inputting control data receipt

Process 0: idle status

Process 1: reading address of received data in receiving buffer 34 and reading sequence number (Here, the sequence number indicates the order of transfer of the frame which is a transfer unit in the ATM)

Process 2: Checking sequence number whether the data is top of the line using Z flag (to check the sequence number whether it is the top of the line is, concretely, to check whether the sequence number, namely, the frame number is a multiple of 10 if 1 line is divided into 10 frames. If it is assumed that the sequence number begins with 0, the data is proved to be the top of the line when the sequence number is a multiple of 10, and it is not proved to be the top of the line when the sequence number is not a multiple of 10. The reason why it should be detected is to reproduce the transferred image data per every scanning line as an image which a person can recognize)

Status Z=1: indicating not the top of the line

Status Z=0: indicating the top of the line

Process 3: setting the destination address in the image memory 36 to the next to previous destination address Process 4: transferring the received data from the receiving buffer 34 to the image memory 36

Process 5: setting the destination address in the image memory 36 to an address jumped by a prescribed amount from the preceding destination address (here, the prescribed amount means a memory amount for 1 line)

Process 6: transferring the received data from the receiving buffer 34 to the image memory 36

Process 7: reading the address of the received data in the receiving buffer 34, reading the content of the data and input to the CPU 37

As described above, assuming that the receiving operation of the image communication terminal 21 is identified with the process flow shown in FIG. 6, the operation is as follows. During idle time, the received data processing part 35 repeats execution of idle status of Process 0. Communication is started and the control data is first transferred to the network interface 33. On receiving it, the network interface 33 transfers the control data to the received data processing part 35. The received data processing part 35 receives it as the process T request and executes process 7, that is, receives the address in the receiving buffer 34 which stores the received data and reads the received data from the receiving buffer 34. The received data processing part 35 also inputs the receipt of the control data to the CPU 37. Then the process returns to process 0 and comes under the idle status.

When the image data is transferred, the network interface 33 transfers it as the process S request to the received data processing part 35. In accordance with the process S request, process 1 is executed and an address in the receiving buffer 34 which stores the received data is read, and moreover, the sequence number of the received data is read. Subsequently, process 2 is executed to check the sequence number, and whether it is the top of the line or not is determined. At that time, determination can be carried out by operation so that the determination result may be reflected in the zero status flag. For example, operation result 0 indicates that the data is not the top of the line, and on the other hand, operation result other than 0 indicates that the data is the top of the line.

In the case where the received data is not the top of the line, the destination address in the image memory 36 is set to the next to the previous received data destination address in process 3, and the received data is transferred from the receiving buffer 34 to the image memory 36 in process 4. If the received data is the top of the line, the destination address in the image memory 36 is set to an address jumped by a prescribed amount from the preceding received data destination address in process 5, and the received data is transferred from the receiving buffer 34 to the image memory 36 in process 6. Thus the processing on the received data can be executed.

In the raster static image communication, a large amount of data is consecutively transferred. Therefore, in the above-described operation, if the capacity of the receiving buffer 34 in the receiving part 32 is less than the total amount of the data to be received, it is required to complete the execution of the process on a single data unit (generally, 1 frame) within the receiving time of the data unit so that the receiving buffer 34 would not overflow. In this case, a problem occurs such that if the overhead in the process switching increases, the time to be used for main data processing is shortened. The problem becomes conspicuous in the case where a data unit (for example, the frame length) is short or the bandwidth becomes higher. In such a case, the use of the program control system of the present invention enables avoiding occurrence of the overhead in process switching, and spending more time in main data processing.

The application example described above relates to the raster static image communication. The use of the program control system of the present invention is effective in the case where the real time data processing is required and the delay must be minimized, such as voice processing or video processing.

The foregoing description of preferred embodiment of this invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A program control system comprising:

plural programs each of which includes an instruction to execute a process corresponding to each of plural statuses of said system;

receiving means for receiving data from a communication network;

detecting means for detecting reception of image data by said receiving means, reception of control data by said receiving means and whether receiving image data is the top of a scanning line;

a program memory for storing said plural programs, said plural programs including a program to be executed when said image data is received, a program to be executed when said control data is received, a program to be executed if said received image data is the top of said scanning line and a program to be executed if said received image data is not the top of said scarning line;

a program counter for outputting an address of said memory at which a part of said plural programs to be executed is stored, said address including a flag which indicates one of said plural statuses; and execution means for reading one of said programs from said program memory in accordance with said address output by said program counter and executing said read program.

2. The program control system according to claim 1, further comprising:

operation means for executing a process in accordance with said program; and said flag including a flag indicating a result of said process executed by said operation means.

3. The program control system according to claim 1, further comprising:

request detecting means for detecting an external request; and said flag including a flag indicating said external request detected by said request detecting means.

4. The program control system according to claim 1, further comprising:

change detecting means for detecting a change of an external status; and said flag including a flag indicating said change of said external status detected by said change detecting means.

5. The program control system according to claim 1, further comprising:

said instruction included in said each of said program stored in said program memory, including at least a part of said address indicated by said program counter; and program counter setting means for setting said part of said address included in said instruction included in said program stored in said program memory to a part of said program counter.

6. The program control system according to claim 1, further comprising:

an instruction memory for storing an instruction executed corresponding to said program stored in said program memory; and second execution means for executing said instruction stored in said instruction memory corresponding to said program stored in said program memory and indicated by said program counter.

7. A program control system comprising:

receiving means for receiving data from a communication network;

detecting means for detecting reception of image data by said receiving means, reception of control data by said receiving means and whether received image data is a top of a scanning line;

a program memory for storing a program to be executed when said image data is received, a program to be executed when said control data is received, a program to be executed if said received image data is the top of said scanning line and a program to be executed if said received image data is not the top of said scanning line;

a program counter for outputting an address of said program stored in said program memory to be executed, said address including a flag indicating a content detected by said detecting means; and received data processing means for executing said program stored in said program memory to be executed when said image data is received in accordance with said address output by said program counter if said detecting means detects receipt of said image data by said receiving means, executing said program stored in said program memory to be executed when said control data is received in accordance with said address output by said program counter if said detecting means detects receipt of said control data by said receiving means, executing said program stored in said program memory to be executed if said received image data is the top of said scanning line in accordance with said address output by said program counter when said detecting means detects that said received image data is the top of said scanning line, and executing said program stored in said program memory to be executed if said received image data is not the top of said scanning line in accordance with said address output by said program counter when said detecting means detects that said received image data is not the top of said scanning line.

* * * * *